United States Patent [19]

Patterson et al.

[11] Patent Number: 4,859,122
[45] Date of Patent: Aug. 22, 1989

[54] POLYGONAL CUTTING INSERT

[75] Inventors: John H. Patterson, Hazel Park; Tony M. Lowe, Royal Oak; Thomas J. Bernadic, Madison Hights; Yefim Val; Karl A. Katbi, both of Troy; Charles E. Zimmerman, Southfield, all of Mich.

[73] Assignee: GTE Valenite Corporation, Troy, Mich.

[21] Appl. No.: 205,048

[22] Filed: Jun. 6, 1988

Related U.S. Application Data

[63] Continuation of Ser. No. 85,839, Aug. 17, 1987, abandoned.

[51] Int. Cl.$^4$ ............................................. B26D 1/00
[52] U.S. Cl. .................................... 407/114; 407/116
[58] Field of Search ................. 407/113, 114, 115, 116

[56] References Cited

U.S. PATENT DOCUMENTS

| 3,786,541 | 1/1974 | Lungren | 407/116 |
| 4,479,744 | 10/1984 | Stricker | 407/114 |
| 4,597,696 | 7/1986 | Maeda | 407/114 |
| 4,626,141 | 12/1986 | Malaker | 407/114 |
| 4,685,844 | 8/1987 | McCreery | 407/114 |
| 4,705,434 | 11/1987 | Patterson | 407/114 |

Primary Examiner—Frederick R. Schmidt
Assistant Examiner—Blynn Shideler
Attorney, Agent, or Firm—Robert E. Walter

[57] ABSTRACT

A polygonal indexable cutting insert has a chip breaker with a backwall having a main portion spaced from the cutting edge and including a plurality lands as to deflect chips in a direction toward the center of the insert.

1 Claim, 2 Drawing Sheets

POLYGONAL CUTTING INSERT

This is a continuation of copending application Ser. No. 07/085,839, filed on Aug. 17, 1987, now abandoned.

BACKGROUND OF THE INVENTION

The present invention relates to disposable cutting inserts which may be detachably mounted on a tool holder for cutting a work piece. Cutting inserts of this type are generally made of cemented metal carbide and are formed by pressing and sintering techniques.

In the type of cutting inserts referred to herein, it is desirable to have an indexable insert which presents a positive rake cutting edge to the working piece.

U.S. Pat. No. 3,885,281 to Stambler describes an insert having both longitudinally curved and transversally curved channels along the side edges of the insert which meeting at the corners of the insert. Also each corner of the insert, V-shaped shallow grooves are depressed into the merging portions of the deeper longitudinal channels to provide chip control for shallow depth cuts.

U.S. Pat. No. 3,786,541 to Lundgren relates to a cutting insert having chip breakers in two stages wherein the cutting edge and the associated chip breaker describe a curve of a particular description.

U.S. Pat. No. 3,786,540 describes an insert having chip control groove extending along a side surface. The width of the groove describes a compound curve such that the width varies along the length of the side.

U.S. Pat. No. 3,399,442 to Jones describes an insert having chip control groove along the entire outer edge comprising an inner and outer region. The outer region is concave in cross-section.

U.S. Pat. No. 4,335,984 to Zweekly describes an insert having a plurality of breaking depressions in the chip breaker surface adjacent to the cutting corner.

U.S. Pat. No. 4,473,480 describes a succession of chip control recesses formed on the cutting face at the outer periphery along the cutting edge. The chip control recesses are generally spherical and may intersect or contact each other as well as the cutting edge.

U.S. Pat. No. 4,215,957 discloses depressions which are generally rectangular with inner corners spaced from the cutting edge.

SUMMARY OF THE INVENTION

As the workpiece is cut, the chip which is removed flows over the cutting edge and downwardly and inwardly along a descending wall portion. The chip next encounters a floor and then an ascending wall which directs the chip upwardly and outwardly. Chip breakers of the prior art include a variety of strategically located islands, bumps, and angles in a variety of configurations which tend to radial deform the flowing chip. This deformation tends to cause breakage of the chip. Heretofore, chip breakers have not concentrated on being oriented to the cutting edge in such a way so as to present an advantageous angle with the cutting edge to deflect the chip in an axial direction or a direction parallel with the cutting edge actually performing the cutting. In the present invention, the chip breaker angle with the cutting edge results an efficient chip-breaking action so as to provide chip control of the chip in an axial direction. More specifically, due to the configuration of the chip breaker, the chip tends to deflect in an axial direction toward the center.

In accordance with the present invention, a polygonal indexable cutting insert comprises a pair of substantially parallel spaced-apart faces and peripheral side surfaces normal to said parallel faces. The faces on the side surfaces are joined to form corners. The pair of cutting edges extend away from each corner substantially within the plane of a respective face. Each cutting edge extends between a corner and its respective adjacent corners. A floor surface is substantially parallel to a respective face surface and spaced downwardly toward the center of the insert therefrom. A ramp surface extends downwardly from a respective cutting edge to the floor surface to form a positive rake insert. A backwall surface is spaced rearwardly of the cutting edge and extends upwardly from a respective floor surface to a respective face surface. The backwall surface extends along a path from a corner of the insert to the other corner and include a plurality of lands projecting toward the cutting edge in a manner tending to deflect chips in a direction parallel to the cutting edge and toward the center of the insert.

It is an object of the present invention to obviate one or more disadvantages of the prior art.

Other and further objects of the present invention will be apparent to one of ordinary skill in the art from reading of the detailed specification.

DETAILED DESCRIPTION OF THE DRAWINGS

DETAILED DESCRIPTION OF THE PREFERRED EMBODIMENT

Figure 1:
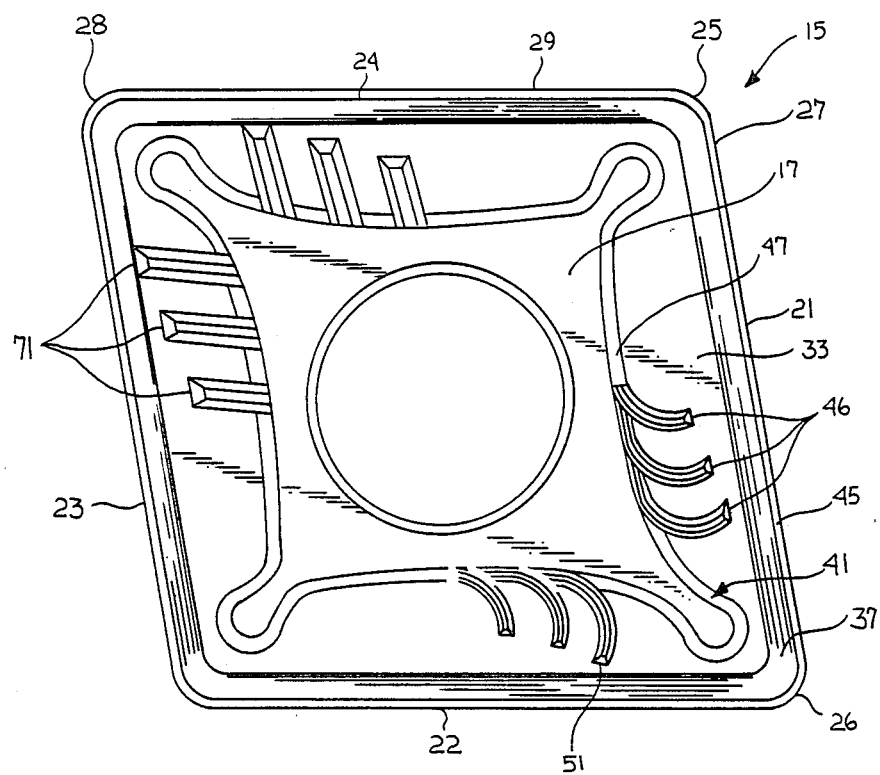
FIG. 1 is a top-elevational view of an insert of the present invention showing two different forms of chip breakers.

As shown in FIG. 1, the cutting insert 15 has substantially parallel faces 17,19 with peripheral side surfaces 21-24 normal to the parallel faces 17,19. The faces 17,19 are joined with side surfaces 21-24 to form eight corners at the junctions. One corner 25 is at the juncture of face 17 and side surfaces 21 and 24. The remaining corners are similarly formed. A pair of cutting edges 27,29 extend away from corner 25 substantially within the plane of a face 17. Cutting edge 27 extends from corner 25 to an adjacent corner 26. Similarly, each of the respective cutting edges extend between adjacent corners.

For purposes of the following discussion, inwardly or the inward direction is toward the center of the insert while outwardly or the outward direction is in a direction away from the center of the insert. With reference to chip flow over a cutting edge, the radial direction is generally perpendicular to the cutting edge while the axial direction is parallel to the cutting edge.

Figure 2:
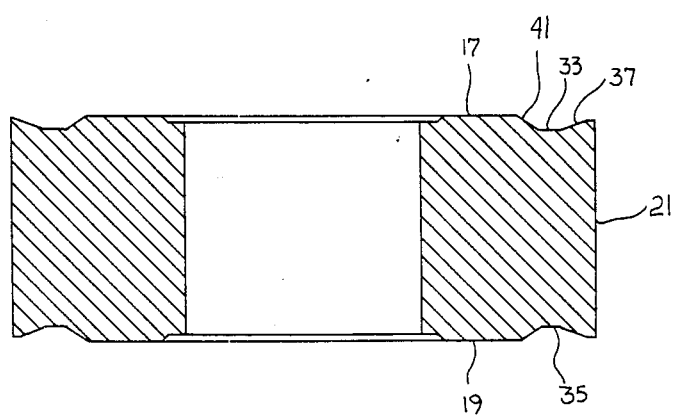
FIG. 2 is a sectional view along section 2—2 of FIG. 1.
Figure 3:
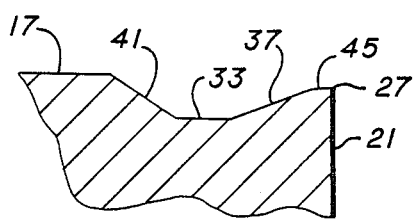
FIG. 3 is a detailed sectional view of a chip breaker along a portion of line 2—2 of FIG. 1.

Continuing with a discussion of FIGS. 1 and 2, the insert 15 is provided with a pair of floor surfaces 33,35. Each floor surface 33,35 is spaced inwardly from the respective face surfaces 17,19. The chip breaker, as shown in FIG. 2 and in detail in FIG. 3, includes a respective ramp surface 37 which extends downwardly from a respective cutting edge 21 to the floor surface 33 and a backwall 41 which slopes upwardly from the floor surface 33 to the face surface 17. Each cutting edge has associated therewith a similarly formed chip breaker.

Figure 4:
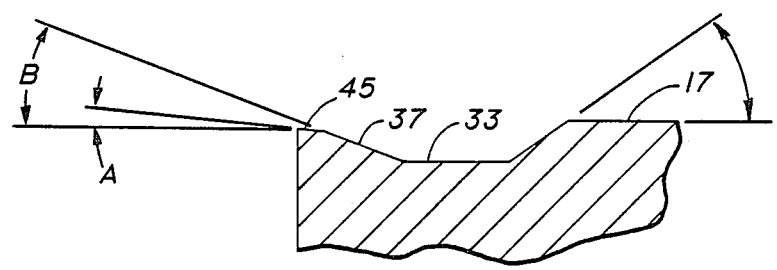
FIG. 4 is a detailed view in section of another portion of the chip breaker along line 4—4 of FIG. 1.

As illustrated in FIG. 1, the ramp surface 37 extends inwardly a predetermined distance from a respective cutting edge 27,29 and forms a land of uniform width extending entirely around the periphery of the insert 15. Typically, each ramp surface includes very small flatland portion 45 extending inwardly therefrom so as to strengthen the cutting edge. In FIG. 4, flatland portion 45 is shown at a 5 degree angle with the face surface 17. Preferably, the ramp surface 37 extends downwardly from the cutting edge at an angle of 15 to about 25 degrees, and more preferably at an angle of about 20° as shown in FIG. 4 at B.

Preferably, the ramp surface 37 extends downwardly a suitable distance respective face surface 17 to the floor surface 33. The floor surface 33 should be sufficiently deep so as to change the direction of chip flow. The directional change enhances the tendency of the chip to break.

The backwall 41 includes a main land portion 47 and a plurality of lands 46 projecting outwardly from the main land portion 41 toward the cutting edge.

The backwall 41 extends intermediate to respective floor surface 33 and a respective face surface 17. As shown in FIG. 1, the main land portion 47 forms a curved path along a direction parallel to the cutting edge and includes a plurality of projecting lands 46. A chip flowing over the cutting edge 27 down the ramp surface 27 and along the floor surface 33 encounters the backwall 41. At the junction of the floor surface 33 and backwall 41, a flowing chip encounters a backwall 41 which functions to deflect the chip in an outward direction away from the floor surface 33 and toward the parallel face 17. Due to the projecting lands 46, the chip tends to flow and be guided in the direction parallel to the cutting edge 27 and away from each of the corners 25,26. More specifically, the main land portion 47 extends from a position closely adjacent a corner to the with projecting lands 46 extending in such a manner that chips tend to be deflected toward inwardly along a direction parallel to the cutting edge. The tendency of chips to flow in a direction parallel with the cutting edge toward the center of the insert is achieved by having the backwall including projecting lands 46 extending at an acute angle with a plane 48 perpendicular or normal to cutting edge. As chips flow over the cutting edge, they tend to be deflected toward the center of the insert.

The main land or main section 47 forms a wave pattern undulating away and then toward the ramp surface 37. Starting at a point closely adjacent corner 26, the main section 47 backwall 41 undulates toward the center of the insert and then outwardly toward an adjacent corner 25. Progressing from corner 26 to 25 in a direction parallel to the cutting edge 21, FIG. 1 shows an embodiment at corner 26 utilizing a plurality of curved projecting lands 46 extending toward the cutting edge 21. The backwall 41 includes at least two projecting lands between each corner, preferably from 3 to 5 projecting lands.

Projecting land 51 is representative of the projecting lands forming the backwall 41. Progressing in a direction parallel to the cutting edge 21 from corner 26 to the center of the insert as represented by center line 63, each of the successive projecting lands 46 terminate at a position more closely adjacent the cutting edge than the previous projecting land.

As illustrated in the embodiment shown at corner 26 FIG. 1, the projecting lands 46 are curved or arcuate. Each of the projecting lands 46 curve toward the center of the insert 15. In the embodiment shown at corner 28, the projecting lands 71 project outwardly toward the cutting edge at an acute angle. In both of the above cases, the purpose directs the chip toward the center of the insert.

In operation, the chip breaker of the present invention tends to influence the flow of the chip in both a radial and axial direction. The greater distance a chip travels before striking a backwall, the greater the radial curve while the shorter the distance the tighter the radial curve. Due to this effect, the projecting lands tend to enhance the tendency of chips to be directed toward the center of the insert.

Although both FIGS. 5 and 1 illustrate an indexable insert having four sides, it is contemplated that triangular inserts may be included within the scope of the present invention together with other variations apparent to one of ordinary skill in the art.

We claim:

1. A polygonal indexable cutting insert comprising a pair of substantially parallel faces and peripheral side surfaces normal to said parallel faces, said faces and said side surfaces being joined to form corners, at a pair of cutting edges extending away from each corner substantially within the plane of a respective one of said faces, a floor surface being substantially parallel to a respective face and spaced downwardly therefrom, a ramp surface extending downwardly from a respective cutting edge to said floor surface whereby said insert has a positive rake, a backwall surface extending between a respective floor surface and respective face surface, and said backwall having a main portion extending in a curved path from each corner to an adjacent corner, said backwall surface extending from a position closely adjacent a corner inwardly toward the center of the insert and outwardly toward an adjacent corner, a plurality of straight projecting lands extending outwardly from the main portion toward the cutting edge in a manner tending to deflect chips inwardly toward the center of said insert, each projecting land having a substantially uniform width and height with each land being longer than the next adjacent projecting land when progressing from a corner to the center of the insert in a direction parallel to the cutting edge.

* * * * *